(No Model.)

F. H. OSBORNE.
GAGE FOR DETERMINING THE SMALLEST CIRCLE WHICH WILL PRODUCE A GIVEN SQUARE.

No. 367,229. Patented July 26, 1887.

Witnesses
E. D. Smith
A. B. Fairchild

Inventor
Frank H. Osborne
By A. M. Wooster
Atty.

UNITED STATES PATENT OFFICE.

FRANK H. OSBORNE, OF STAMFORD, CONNECTICUT.

GAGE FOR DETERMINING THE SMALLEST CIRCLE WHICH WILL PRODUCE A GIVEN SQUARE.

SPECIFICATION forming part of Letters Patent No. 367,229, dated July 26, 1887.

Application filed March 28, 1887. Serial No. 232,644. (No model.)

*To all whom it may concern:*

Be it known that I, FRANK H. OSBORNE, a citizen of the United States, residing at Stamford, in the county of Fairfield and State of Connecticut, have invented certain new and useful Improvements in Gages for Determining the Smallest Circle that will Produce a Given Square; and I do hereby declare the following to be a full, clear, and exact description of the invention, such as will enable others skilled in the art to which it appertains to make and use the same.

My invention has for its object to produce a tool for this special purpose which shall be simple in construction, economical in cost, and so easy to use that not only the skilled mechanic, but an unskilled mechanic, can operate it with perfect accuracy, all mathematical calculation being rendered unnecessary.

In metal-working it is frequently necessary to determine accurately to what diameter a shaft or bar may be turned down and still produce a given square, and likewise to ascertain what is the greatest square that can be produced from any round piece of metal. Heretofore, so far as I am aware, no gage or other tool has been produced for accomplishing this result. In machine-shops at present when a given square is required to be produced at the end of a shaft or bar of metal quite a complicated mathematical computation is required to determine to what extent the bar may be reduced and still produce the required square, and an equally difficult mathematical computation is required to determine the greatest square that can be produced from a bar or shaft of a given diameter. While these computations are not difficult to the higher grades of skilled mechanics, considerable time is necessarily consumed in insuring the accuracy of the computation, and to other than skilled mechanics the computations are absolutely impossible. In order to overcome these objections and produce a gage that may be used for this purpose with perfect accuracy by any mechanic, skilled or unskilled, I have devised the simple and novel construction of which the following description, in connection with the accompanying drawings, is a specification.

Figure 1:
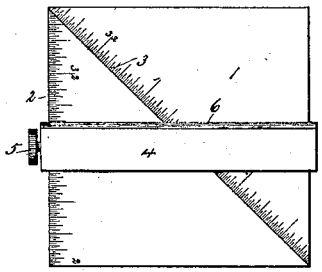
Figure 2:
Figure 3:
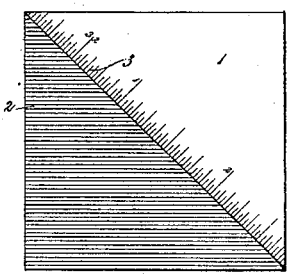

Figure 1 is a plan view of my novel gage; Fig. 2, a cross-section thereof, and Fig. 3 is a plan view of a form of my invention in which the slide is dispensed with.

My novel tool consists of a plate, which I have designated by 1. This plate is preferably made of metal, but may, of course, be made of any other suitable material.

The essential features of my invention consist in two gages upon said plate which bear the relation to each other of the diagonal and one side of a square. The gage at the side of the plate, which I term, for convenience, the "straight" gage, is indicated by 2, and the other gage, corresponding with the diagonal of a square, which I term, for convenience, the "diagonal" gage, is indicated by 3. The graduation of these gages is not of the essence of my invention, and may be made to suit the class of work for which the tool is intended. For ordinary purposes I graduate both gages in either sixty-fourths or thirty-seconds of an inch, as shown in the drawings.

4 is a slide which engages the opposite edges of the plate, being free to move over the surface thereof when not locked by set-screw 5. The operative edge of the slide is preferably beveled down, as shown at 6 in Fig. 1. This, however, is a mere detail of construction, and is in nowise essential to the operativeness of the tool. In use the straight gage corresponds with the sides of a square and the diagonal gage with the diameter of a circle.

The operation is as follows: Suppose that it is desired to ascertain the smallest diameter of a circle from which a given square may be produced. The set-screw is loosened and the slide moved to the graduation-mark in the straight gage corresponding with the length of a side of the square. The set-screw is then tightened, which locks the slide in that position. The graduation-mark upon the diagonal gage at which the slide rests will now indicate the required diameter of the smallest circle from which the required square may be produced. Should it be required to ascertain the greatest square that can be produced from a circle of a given diameter, the slide is set at the required graduation-mark of the diagonal gage and locked there. The corresponding mark upon the straight gage will then indicate the length of the side of the greatest square that can be produced from a circle of that diameter.

In the form illustrated in Fig. 3 the slide is dispensed with and the graduation-marks of the straight gage are carried out toward the center of the plate until they intersect with the diagonal gage.

Having thus described my invention, I claim—

1. As a new manufacture, a gage for determining the smallest circle that will produce a given square, the same consisting of a plate having a gage, 2, and a gage, 3, bearing the relation thereto of the diagonal and one side of a square, and a slide adapted to move over the face of said plate.

2. In a gage for determining the smallest circle that will produce a given square, the combination, with a plate having a gage, 2, and a gage, 3, bearing the relation thereto of the diagonal and one side of a square, of a slide adapted to move over the face of said plate and to register with said gages, and a set-screw whereby said slide may be locked at any desired position, as and for the purpose set forth.

3. A tool of the class described having a straight gage and a diagonal gage, said gages bearing the relation to each other of the diagonal and one side of a square, the graduation-marks of the straight gage being extended inward until they intersect with the diagonal gage.

In testimony whereof I affix my signature in presence of two witnesses.

FRANK H. OSBORNE.

Witnesses:
LOUIS M. FRENCH,
EDW. B. HINDLEY.